United States Patent [19]

Malcolm

[11] Patent Number: 5,086,502
[45] Date of Patent: Feb. 4, 1992

[54] METHOD OF OPERATING A DATA PROCESSING SYSTEM

[75] Inventor: Peter B. Malcolm, Lewdown, England

[73] Assignee: Intelligence Quotient International Limited, England

[21] Appl. No.: 435,138

[22] Filed: Nov. 13, 1989

[30] Foreign Application Priority Data

Jul. 11, 1989 [GB] United Kingdom ............ 8915875

[51] Int. Cl.$^5$ .......................................... G06F 11/00
[52] U.S. Cl. ..................... 395/575; 364/268.1; 364/268.5; 364/285.1; 364/DIG. 1; 364/943.92; 364/944.1; 364/944.2; 364/DIG. 2
[58] Field of Search ............... 364/200, 900; 371/12, 371/13, 10.1

[56] References Cited

U.S. PATENT DOCUMENTS

| | | | |
|---|---|---|---|
| 4,051,461 | 9/1977 | Hashimoto | 371/10.1 X |
| 4,159,517 | 6/1979 | Paradine et al. | 364/200 |
| 4,380,047 | 4/1983 | Eisenhard | 364/200 |
| 4,380,067 | 4/1983 | Beardsley | 364/200 X |
| 4,434,487 | 2/1984 | Rubinson | 371/13 X |
| 4,507,751 | 3/1985 | Gawlick et al. | 364/900 |
| 4,740,969 | 4/1988 | Fremont | 371/13 |
| 4,953,122 | 8/1990 | Williams | 371/10.1 X |
| 4,959,774 | 9/1990 | Davis | 371/12 X |

FOREIGN PATENT DOCUMENTS

| | | |
|---|---|---|
| 0090175 | 10/1983 | European Pat. Off. . |
| 0108578 | 5/1984 | European Pat. Off. . |
| 0229232 | 7/1987 | European Pat. Off. . |
| 0230616 | 8/1987 | European Pat. Off. . |
| 0249090 | 12/1987 | European Pat. Off. . |
| 0250847 | 1/1988 | European Pat. Off. . |
| 2136175 | 9/1984 | United Kingdom . |
| 2195193 | 3/1988 | United Kingdom . |

Primary Examiner—Robert W. Beausoliel
Attorney, Agent, or Firm—Hale & Dorr

[57] ABSTRACT

A method of operating a data processing system, in particular a micro-computer, comprises a backup process in which a copy of every change made to a storage medium is recorded as the change occurs. Write operations for writing data to the storage medium are each preceded by a backup write operation to backup storage means, successive backup write operations being controlled so as to be stored as a sequential list in the backup storage means in the form of location blocks and data blocks to avoid the overwriting occurring in the storage medium. These backup write operations are executed at the level of the basic input/output system (BIOS) of the microcomputer in such a manner that normal use of the computer is unaffected. The method also includes a restore process in which bad sectors of a destination storage device are avoided by translating the file allocation table (FAT) and directories of the original data.

21 Claims, 3 Drawing Sheets

METHOD OF OPERATING A DATA PROCESSING SYSTEM

BACKGROUND OF THE INVENTION

This invention relates to a method of operating a data processing system, and in particular to a method of providing copies of data stored in storage devices to guard against the possibility of the storage devices becoming faulty or the data becoming corrupted, lost or, more recently, "infected by a computer virus". The invention is especially concerned with the provision of backups for personal computers (P.C.s).

With the increasing capacity of fixed storage media such as hard disk drives (now typically having storage capacities of upwards of 40 megabytes), the time and effort involved in making security copies of a disk is increasing.

At present, there are two options available to the average P.C. user. Commercial software exists to speed up the process of copying data onto a series of floppy disks. Whilst being an inexpensive solution, the method is tedious and time consuming. A 40 megabyte hard disk would at best require over 30 floppy disks to be fully copied, with the user required to change the disks throughout the backup.

The most effective option, however, is to copy the data on to a removable tape cartridge. Typically only one cartridge would be necessary, and for a 40 megabyte drive, the process would typically be completed in around fifteen minutes.

These methods have two drawbacks in addition to those already mentioned. Firstly, in each case, the user must make a conscious decision to perform the backup. The P.C. must be instructed to run the backup program, and the user must then wait for completion before a copy is available. Secondly, no existing backup method gives total protection against loss of data since the copied data exists only as an image of the storage medium at the time the copy was made, and subsequently stored data cannot be protected. It is an object of this invention to provide a means of backing up stored data which offers the possibility of overcoming such disadvantages.

SUMMARY OF THE INVENTION

The present invention provides a backup system in which a copy of every change made to a storage medium is recorded as the change occurs. This backup recording can be stored in a variety of storage means, for example a tape drive, optical disk, or in another area of the basic storage medium.

The backup process may be controlled by software which causes the data in successive write operations to be copied to the backup storage means as a sequential list of write operations in such a manner that normal use of the computer, in particular, use of the application software, is substantially unaffected.

According to one aspect of the invention, there is provided a method of operating a data processing system including a random access memory, a central processing unit and a non-volatile storage device, in which the central processing unit, operating according to instructions stored in the memory, is caused to write data periodically to basic storage means forming at least part of the storage device, and in which, for a plurality of such write operations, the central processing unit is caused by the said instructions to execute a plurality of corresponding backup write operations to write the same data to backup storage means which may comprise a different part of the storage device or another non-volatile storage device. The backup write operations are controlled such that the data for successive backup write operations are stored at different locations in the backup storage means whereby data which is overwritten in the basic storage means is retained in the backup storage means. This backup process thus occurs in real time. Since individual changes to the basic storage means take only fractional amounts of time, and since the backup copy may be made virtually simultaneously, there need not be any substantially noticeable change in the operation of the data processing system or its performance. The user may operate the system normally, and a backup copy of changes to the basic storage means can be made automatically, without any user intervention.

Preferably, the instructions referred to above, specifically the instructions for causing the backup write operations, are programmed into the system so as to form part of or an extension of the basic input/output system (i.e. at the basic input/output level). In the case of IBM—compatible machines, to which the invention is particularly applicable, the software is stored as an additional routine which is accessed by the system whenever a write operation is initiated. Thus, before each conventional write operation using the Interrupt 13 hex ("INT13h") routine, the machine is caused to execute an additional write operation for writing the data to the backup storage means additionally to a similar write to the basic storage means, when used in an IBM compatible system. By adding program code to INT13h, an instruction to write data using INT13h also results in the data being copied, together with the location in the basic storage means where it is to be written, to the backup storage means before continuing with the original routine. The copied information is preferably stored as a sequential list of write operations. This means that the writing of a piece of data to the same location of the basic storage means more than once in succession would result in a list of separate commands being copied to the backup storage device. This backup method can be performed immediately, without affecting any application software being used on the system. In effect, it produces a complete audit trail of every change made to the device in such a manner that information is not lost.

The basic storage means may form part of or constitute any non-volatile storage device, but in the case of a personal computer is normally constituted by a so-called hard disk. The backup storage means may be part of or be constituted by a tape drive, another disk drive, an optical disc, or another part of a disk drive containing the basic storage means.

If the software for performing the method of the invention is stored at the basic input/output level, it can be made transparent to the user so as not to affect application software.

To restore information to destination storage means, which may be constituted by the same storage device as the basic storage means following a fault, or an alternative storage device, the sequential list of write operations stored in the backup storage means is simply replayed, and the original data copied to the destination storage means at the locations specified. Advantageously, this process can be stopped at any time so as to restore the data to the state in which it existed at any selected time. In this way, a selected number of most recent write operations can be ignored.

In the case of hard disk storage media, every hard disk has bad sectors, details of which are recorded in a File Allocation Table (FAT) when the disk is formatted on the system. If the disk fails because, for instance, a sector or sectors become damaged, then not only will data be lost but the disk will need to be reformatted, thereby creating a new FAT. As part of the preferred method of operation in accordance with this invention, the FAT for the basic storage means is stored in the backup storage means, generally as the first piece of information, so that for restoring, the system is able to modify the addresses of data stored in the backup storage means when restoring to a new disk or reformatted disk.

Thus, according to another aspect of this invention, there is provided a method of operating a data processing device including providing backup storage means for storing as a sequential list write operations written to basic storage means, each write operation being stored in the basic storage means as a location element and a data element, the location element containing information relating to the location of the data when stored in the basic storage means. Restoring of the data from the backup storage means to destination storage means includes determining the location of faulty parts of the destination storage means and establishing a translation table for allocating to the data elements new location elements in place of the stored location elements for restoring the data elements to correctly functioning parts of the destination storage means. The method may also include alteration of a file allocation table and directories in the original data, specifically the root directory followed by each sub-directory, so that any address reference held by the original operating system is altered to reflect a change in its location whereby the operating system and hence the application software can then make use of the data as stored on the destination storage means.

The invention will now be described by way of example with reference to the drawings:

DESCRIPTION OF THE PREFERRED
EMBODIMENT OF THE INVENTION

Figure 1:
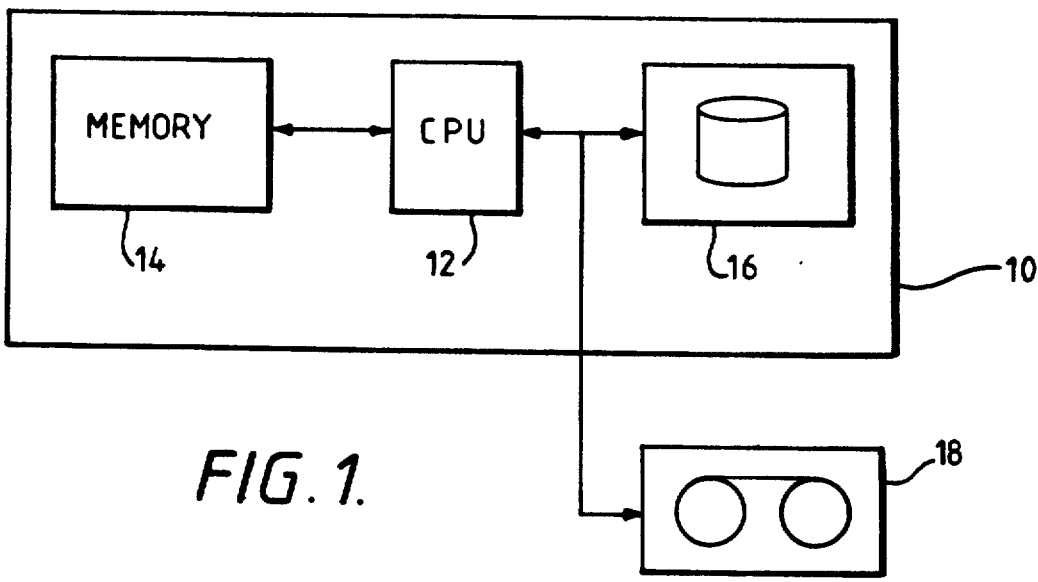
FIG. 1 is a block diagram of a personal computer and a cartridge tape drive.

Referring to FIG. 1 of the drawings, a personal computer 10 typically comprises a central processing unit 12, a random access memory 14, and a non-volatile storage device in the form of a hard disk drive 16. In this example, for the purpose of providing backup storage means, a tape unit 18 is coupled to the computer 10.

Figure 2A:
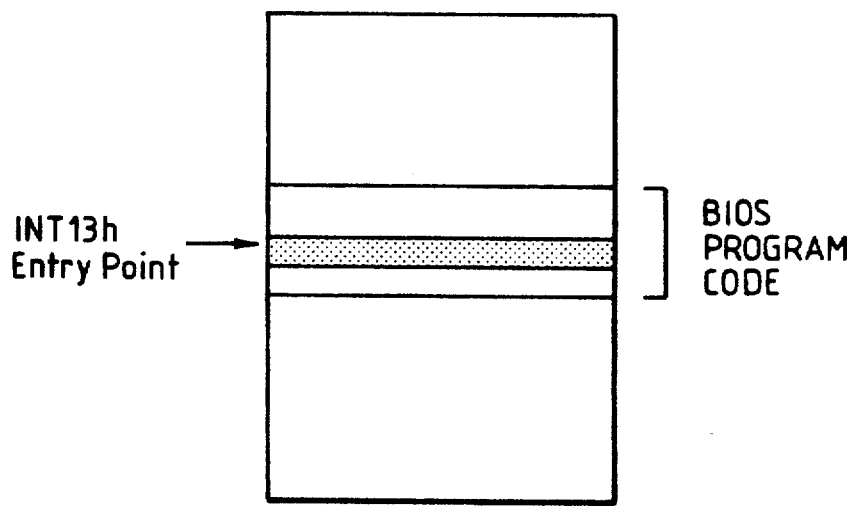
FIGS. 2A and 2B are diagrams illustrating a system memory map at the basic input/output level of a conventional personal computer and a computer modified to operate in accordance with the method of the invention respectively.
Figure 2B:
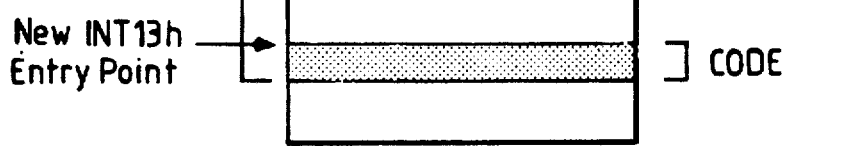

The invention is particularly applicable to IBM compatible personal computers, i.e. the majority of personal computers using processor chips type numbers 8086, 8088, 80286, 80C286, 80386, 80386SX and 80486 manufactured by Intel. In such computers, whenever a program requires the storage of data in the hard disk drive, it places data in a memory buffer and calls a standard routine which writes data to the disk. This routine, known as Interrupt 13 hex (INT13h) is permanently programmed into the hardware of the computer's disk drive controller and forms part of the basic input/output system (BIOS) built into the computer. This routine is shown in FIG. 2A as INT13h forming part of the BIOS program code in a system memory map, the INT13h entry point being shown by an arrow. To carry out a preferred method in accordance with the invention, additional program code is added at the basic input/output level as shown in FIG. 2B. In practice, this can be loaded into the computer as a device driver using the CONFIG.SYS file.

Figure 3:
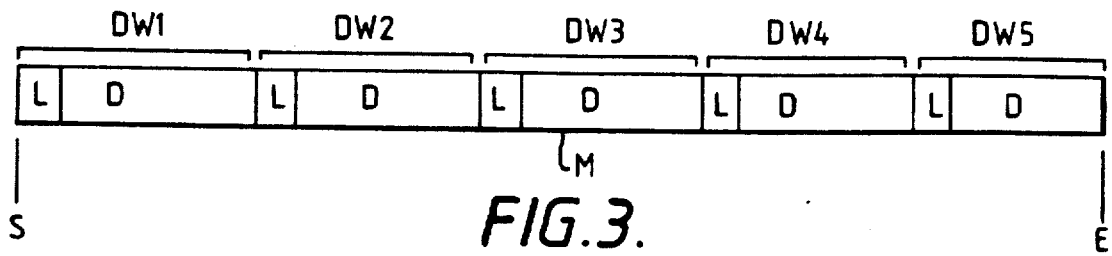
FIG. 3 is a diagram illustrating the organization of the data when stored in a backup storage medium.

The added software has the effect of an instruction to write data being interpreted not only as an instruction to write data to the disk drive 16 but also to the tape drive 18. Preferably, writing to the tape drive takes place first. Thus, the write instruction involves a new entry point as shown arrowed in FIG. 2B, whereupon the new program code causes information in the form of a location block followed by a data block to be written to the tape drive, the location block containing the track number of the disk drive to which the data would be written by the INT13h routine, the sector number, the disk drive head, the drive identification, and the length of the data in terms of the number of sectors. In effect, successive write operations are stored as a sequential list of operations, each disk write operation DW1, DW2, . . . being identified by a block pair comprising the location block L and data block D as shown in FIG. 3, the backup storage means M (the tape drive) having a start S and end E, as shown. Once the backup write operation has been performed, the normal write operation to the disk drive is performed using the conventional BIOS program code, as if nothing different had happened.

Figure 4:
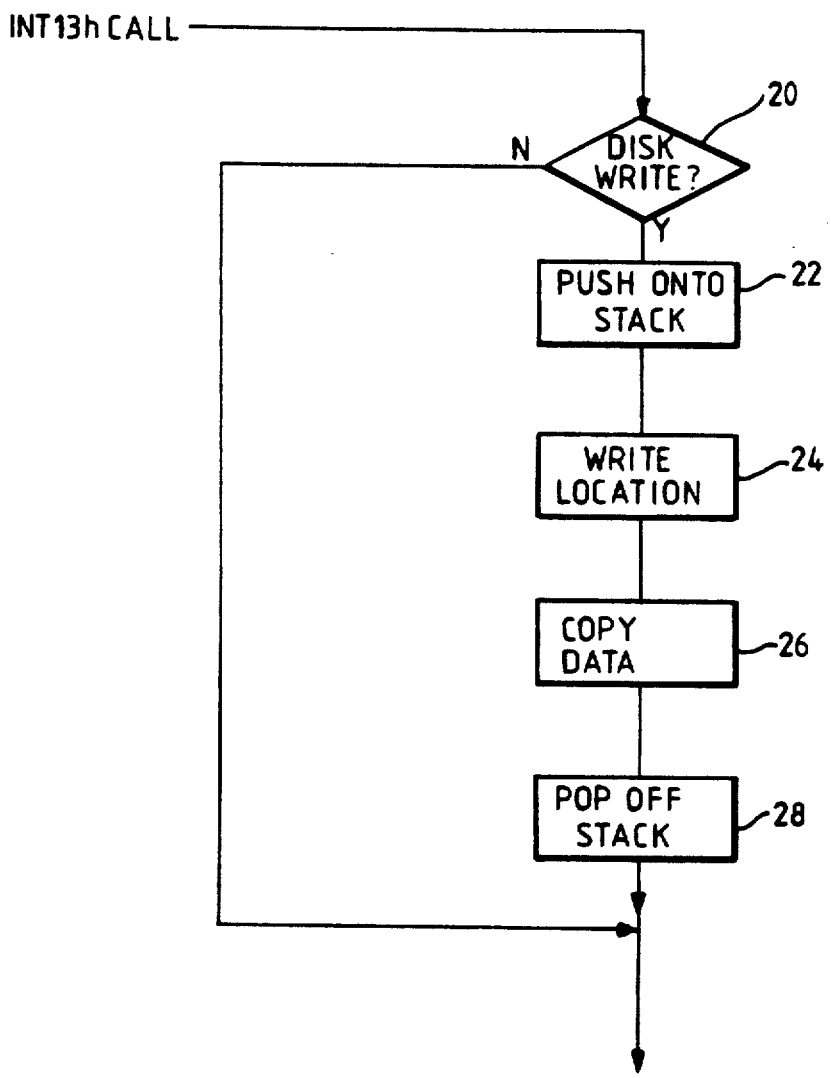
FIG. 4 is a flow chart of a method for recording data in a backup operation.

The relevant sequence of operations is shown in the flow chart of FIG. 4. On receipt of an INT13h call, the program first checks, in step 20, whether the call is a write call. If it is, the contents of the microprocessor registers are preserved in memory by a PUSH instruction to stack (step 22). The register location details are then written to the backup storage means, the tape drive, as the location block in step 24, followed by the data copied from the memory buffer as the data block (step 26). The register contents are then returned to the microprocessor registers from the stack by a POP instruction 28, whereupon the conventional write operation to the basic storage means, the computer disk, can take place beginning at the original INT13h entry point as if the backup write operation just described had never been performed.

As a result of this sequence of events, after a period of time and several write operations, the tape drive 18 contains a complete record of all data information stored on the disk drive, including information which has been overwritten by write operations being performed more than once to the same locations.

Should an error on the disk occur, the backup can be replayed, reproducing all of the disk changes at high speed and restoring the data (generally to the reformatted disk drive).

All hard disks contain a small proportion of unusable sectors. These are identified in the operating system by a program which, in IBM—compatible machines is referred to as the DOS FORMAT program, and are marked as bad in the file allocation table (FAT) stored on every disk. DOS checks the information in the FAT to avoid using these bad areas. It is highly unlikely that two hard disks (even of exactly the same type) would have the same pattern of bad sectors. Any given hard disk will develop additional bad sectors over its life, which means that if the disk is then reformatted, the additional bad sectors will be marked in the FAT and the disk can continue to be used. From the above it will be clear that the layout of bad sectors on a disk to which the stored backup data is required to be restored will generally be different from the layout of the disk which was operative when the backup copy was taken.

To overcome the difficulty of restoring data to a disk with a different layout of bad sectors, the location blocks referred to above are altered. In particular, the location blocks are altered so that the data can be written to another location on the disk without following data from the backup tape overwriting it. In addition, the file allocation table and directories in the personal computer are changed so that data is read from good sectors of the disk to which the backup data has been restored. Of course, this means that data can be restored to a destination storage means having a different physical layout from the original. The destination storage means may, for example, be a disk which may be the same disk as that of the basic storage means or a different disk. The capacity of the drive can be similar, but the combination of sectors, tracks, and heads could be different.

Figure 5:
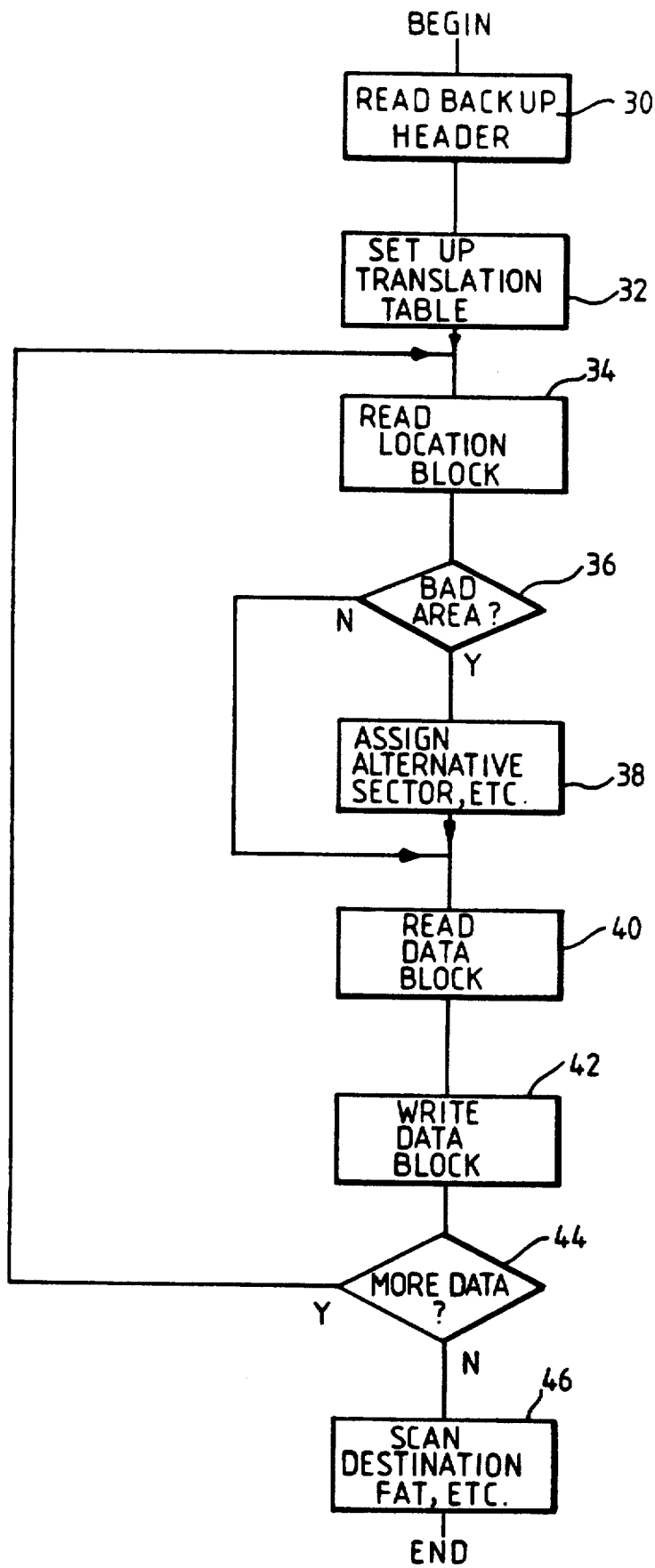
FIG. 5 is a flow chart illustrating a restoring operation.

Referring to FIG. 5, the recovery procedure begins with a read step 30 in which the header of the backup storage means is read to establish the size of the storage means and its FAT. At this point the track/sector/head information in each location block is connected into a single logical sector number, where 0 is the first sector on the original disk (track 0, head 0, sector 1) and X is the last sector number (last track, last head, last sector).

Next, a FAT translation table is established (step 32) in memory and the memory is cleared ready for new data. The translation table is initially empty. The first location block is read from the backup storage means (step 34) and a check is made for any bad part of the corresponding area in the destination storage means (step 36). If the area is bad, an alternative sector of the destination storage means is assigned in step 38 and the change in location is noted in the translation table. In other words, the original logical sector number of the location block is converted to a number representing a new track/sector/head coordinate based on the parameters of the destination storage means so that a one-to-one correlation occurs between the logical layouts of the original and destination storage means. Any further attempts to write to the same bad sector are instead interpreted as writes to this newly assigned sector.

Having assigned an alternative sector, the relevant data block is read from the backup storage means (step 40) and written to the destination storage means (step 42). Naturally, if the check made in step 36 indicates that the area of the destination storage means corresponding to the sector number in the original location block has no bad parts, no alternative sector need be assigned and the instructions of steps 40 and 42 are executed immediately after the checking of step 30.

If the software later attempts to write data over a sector which is itself an area of re-assigned data then the software re-assigns that area also. Thus, as the write operations spoilt by the backup storage means are restored to the destination storage means, the table is progressively filled with translated location data.

If there are further location and data blocks (determined in step 44), the program loops back to step 34 and the above-described steps 34 to 44 are repeated for each location and data block pair until all of the required data in the backup storage means has been written to the destination storage means.

Provided that there are as many free sectors on the destination storage means as were used on the original disk (a pre-requisite of the restore operation of any backup system), no data will be overwritten or lost.

Whilst the data now all exists on the destination storage means, areas have been moved and the operating system of the computer (DOS) is no longer configured to operate with the data layout. To deal with this, the backup software scans the FAT, then the root directory, followed by each sub-directory, changing the address (cluster) references (which are in known locations) of any area which have been re-mapped in the translation table (step 46). Any such address reference held by DOS is therefore altered to reflect a change in its location, and DOS can once again understand the layout of the storage means and all data will be intact.

An example of part of the restore process will now be given. The reader is referred to the IBM DOS Technical Reference Manual for background material, if required. The disclosure of this Manual is included in this specification by reference.

Suppose the destination storage means, hereinafter referred to as the destination disk, has a fault in clusters 26 and 27 (001A and 001B hex) so that these clusters cannot be used. When an attempt is made at restoring to these clusters, the software determines that they are marked as bad and it is necessary to re-map the clusters to another free location, say clusters 192 and 193 (00C0 and 00C1 hex).

The internal translation table would read as follows:

| Source | Destination |
|--------|-------------|
| 26     | 192         |
| 27     | 193         |

The original FAT might appear as in the following table:

TABLE 1

| Partial Hex Dump of Original FAT Sector | | | | | | | | | | | | | | | |
|---|---|---|---|---|---|---|---|---|---|---|---|---|---|---|---|
| 000 | F8 | FF | FF | FF | 03 | 00 | 04 | 00 | 05 | 00 | 06 | 00 | 07 | 00 | 08 | 00 |
| 010 | 09 | 00 | 0A | 00 | 0B | 00 | 0C | 00 | 0D | 00 | 0E | 00 | 0F | 00 | 10 | 00 |
| 020 | 11 | 00 | 12 | 00 | 13 | 00 | 14 | 00 | 15 | 00 | 16 | 00 | 17 | 00 | 18 | 00 |
| 030 | 19 | 00 | 1A | 00 | FF | FF | 1C | 00 | 1D | 00 | 1E | 00 | 1F | 00 | 20 | 00 |
| 040 | 21 | 00 | 22 | 00 | 23 | 00 | 24 | 00 | 25 | 00 | 26 | 00 | 27 | 00 | 28 | 00 |
| 050 | 29 | 00 | 2A | 00 | 2B | 00 | 2C | 00 | 2D | 00 | 2E | 00 | 2F | 00 | 30 | 00 |

TABLE 1-continued

Partial Hex Dump of Original FAT Sector

| 060 | 31 | 00 | 32 | 00 | 33 | 00 | FF | FF | 35 | 00 | 36 | 00 | 37 | 00 | 38 | 00 |
|---|---|---|---|---|---|---|---|---|---|---|---|---|---|---|---|---|
| 070 | 39 | 00 | 3A | 00 | 3B | 00 | 3C | 00 | 3D | 00 | 3E | 00 | 3F | 00 | 40 | 00 |
| 080 | 41 | 00 | 42 | 00 | 43 | 00 | 44 | 00 | 45 | 00 | 46 | 00 | FF | FF | 00 | 00 |
| 090 | 00 | 00 | 00 | 00 | 00 | 00 | 00 | 00 | 00 | 00 | 00 | 00 | 00 | 00 | 00 | 00 |
| 0A0 | 00 | 00 | 00 | 00 | 00 | 00 | 00 | 00 | 00 | 00 | 00 | 00 | 00 | 00 | 00 | 00 |
| 0B0 | 00 | 00 | 00 | 00 | 00 | 00 | 00 | 00 | 00 | 00 | 00 | 00 | 00 | 00 | 00 | 00 |
| 0C0 | 00 | 00 | 00 | 00 | 00 | 00 | 00 | 00 | 00 | 00 | 00 | 00 | 00 | 00 | 00 | 00 |
| 0D0 | 00 | 00 | 00 | 00 | 00 | 00 | 00 | 00 | 00 | 00 | 00 | 00 | 00 | 00 | 00 | 00 |
| 0E0 | 00 | 00 | 00 | 00 | 00 | 00 | 00 | 00 | 00 | 00 | 00 | 00 | 00 | 00 | 00 | 00 |
| 0F0 | 00 | 00 | 00 | 00 | 00 | 00 | 00 | 00 | 00 | 00 | 00 | 00 | 00 | 00 | 00 | 00 |

Note that byte pair FF FF marks End of File.

In the translated FAT on the destination disk (shown below in Table 2), references to the re-mapped clusters are changed to their translated address, thus the reference to cluster 26 (shown underlined) must be changed to cluster 192 (00C0 hex).

Cluster 27 was marked as End of File in the original FAT and remains so in its translated location at cluster 193.

Note that cluster 26 and 27 are now marked bad with the byte pair F7 FF.

TABLE 2

Partial Hex Dump of FAT After References Changed

| 000 | F8 | FF | FF | FF | 03 | 00 | 04 | 00 | 05 | 00 | 06 | 00 | 07 | 00 | 08 | 00 |
|---|---|---|---|---|---|---|---|---|---|---|---|---|---|---|---|---|
| 010 | 09 | 00 | 0A | 00 | 0B | 00 | 0C | 00 | 0D | 00 | 0E | 00 | 0F | 00 | 10 | 00 |
| 020 | 11 | 00 | 12 | 00 | 13 | 00 | 14 | 00 | 15 | 00 | 16 | 00 | 17 | 00 | 18 | 00 |
| 030 | 19 | 00 | C0 | 00 | F7 | FF | F7 | FF | 1D | 00 | 1E | 00 | 1F | 00 | 20 | 00 |
| 040 | 21 | 00 | 22 | 00 | 23 | 00 | 24 | 00 | 25 | 00 | 26 | 00 | 27 | 00 | 28 | 00 |
| 050 | 29 | 00 | 2A | 00 | 2B | 00 | 2C | 00 | 2D | 00 | 2E | 00 | 2F | 00 | 30 | 00 |
| 060 | 31 | 00 | 32 | 00 | 33 | 00 | FF | FF | 35 | 00 | 36 | 00 | 37 | 00 | 38 | 00 |
| 070 | 39 | 00 | 3A | 00 | 3B | 00 | 3C | 00 | 3D | 00 | 3E | 00 | 3F | 00 | 40 | 00 |
| 080 | 41 | 00 | 42 | 00 | 43 | 00 | 44 | 00 | 45 | 00 | 46 | 00 | FF | FF | 00 | 00 |
| 090 | 00 | 00 | 00 | 00 | 00 | 00 | 00 | 00 | 00 | 00 | 00 | 00 | 00 | 00 | 00 | 00 |
| 0A0 | 00 | 00 | 00 | 00 | 00 | 00 | 00 | 00 | 00 | 00 | 00 | 00 | 00 | 00 | 00 | 00 |
| 0B0 | 00 | 00 | 00 | 00 | 00 | 00 | 00 | 00 | 00 | 00 | 00 | 00 | 00 | 00 | 00 | 00 |
| 0C0 | FF | FF | 1C | 00 | 00 | 00 | 00 | 00 | 00 | 00 | 00 | 00 | 00 | 00 | 00 | 00 |
| 0D0 | 00 | 00 | 00 | 00 | 00 | 00 | 00 | 00 | 00 | 00 | 00 | 00 | 00 | 00 | 00 | 00 |
| 0E0 | 00 | 00 | 00 | 00 | 00 | 00 | 00 | 00 | 00 | 00 | 00 | 00 | 00 | 00 | 00 | 00 |
| 0F0 | 00 | 00 | 00 | 00 | 00 | 00 | 00 | 00 | 00 | 00 | 00 | 00 | 00 | 00 | 00 | 00 |

It is now necessary to look at the Root Directory as shown in Table 3 below.

TABLE 3

Partial Hex Dump of Original Root Directory Sector

| 000 | 46 | 49 | 4C | 45 | 31 | 20 | 20 | 20 | 54 | 20 | 00 | 00 | 00 | 00 | 00 | 00 | FILE1...TXT. |
|---|---|---|---|---|---|---|---|---|---|---|---|---|---|---|---|---|---|
| 010 | 00 | 00 | 00 | 00 | 00 | 00 | 00 | 60 | 71 | 0E | 02 | 00 | DB | 62 | 00 | 00 | ... |
| 020 | 46 | 49 | 4C | 45 | 31 | 20 | 20 | 20 | 54 | 20 | 00 | 00 | 00 | 00 | 00 | 00 | FILE2...TXT. |
| 030 | 00 | 00 | 00 | 00 | 00 | 00 | 00 | 60 | 71 | 0E | 1B | 00 | DB | 62 | 00 | 00 | ... |
| 040 | 46 | 49 | 4C | 45 | 31 | 20 | 20 | 20 | 54 | 20 | 00 | 00 | 00 | 00 | 00 | 00 | FILE3...TXT. |
| 050 | 00 | 00 | 00 | 00 | 00 | 00 | 00 | 60 | 71 | 0E | 34 | 00 | DB | 62 | 00 | 00 | ... |
| 060 | 00 | 00 | 00 | 00 | 00 | 00 | 00 | 00 | 00 | 00 | 00 | 00 | 00 | 00 | 00 | 00 | ... |
| 070 | 00 | 00 | 00 | 00 | 00 | 00 | 00 | 00 | 00 | 00 | 00 | 00 | 00 | 00 | 00 | 00 | ... |
| 080 | 00 | 00 | 00 | 00 | 00 | 00 | 00 | 00 | 00 | 00 | 00 | 00 | 00 | 00 | 00 | 00 | ... |
| 090 | 00 | 00 | 00 | 00 | 00 | 00 | 00 | 00 | 00 | 00 | 00 | 00 | 00 | 00 | 00 | 00 | ... |
| 0A0 | 00 | 00 | 00 | 00 | 00 | 00 | 00 | 00 | 00 | 00 | 00 | 00 | 00 | 00 | 00 | 00 | ... |
| 0B0 | 00 | 00 | 00 | 00 | 00 | 00 | 00 | 00 | 00 | 00 | 00 | 00 | 00 | 00 | 00 | 00 | ... |
| 0C0 | 00 | 00 | 00 | 00 | 00 | 00 | 00 | 00 | 00 | 00 | 00 | 00 | 00 | 00 | 00 | 00 | ... |
| 0D0 | 00 | 00 | 00 | 00 | 00 | 00 | 00 | 00 | 00 | 00 | 00 | 00 | 00 | 00 | 00 | 00 | ... |
| 0E0 | 00 | 00 | 00 | 00 | 00 | 00 | 00 | 00 | 00 | 00 | 00 | 00 | 00 | 00 | 00 | 00 | ... |
| 0F0 | 00 | 00 | 00 | 00 | 00 | 00 | 00 | 00 | 00 | 00 | 00 | 00 | 00 | 00 | 00 | 00 | ... |

The starting Cluster references are shown underlined and are as follows:

FILE1.TXT Starting Cluster 0002 (hex) 2 (Decimal)
FILE2.TXT Starting Cluster 001B (hex) 27 (Decimal)
FILE3.TXT Starting Cluster 0034 (hex) 52 (Decimal)

The translation table shows cluster 27 is re-mapped to cluster 192 and, therefore, the starting cluster reference of FILE2.TXT is changed to 192 (00C0 hex), as shown in Table 4.

TABLE 4

Partial Hex Dump of Root Directory Sector After References Changed

| 000 | 46 | 49 | 4C | 45 | 31 | 20 | 20 | 20 | 54 | 20 | 00 | 00 | 00 | 00 | 00 | 00 | FILE1...TXT... |
|---|---|---|---|---|---|---|---|---|---|---|---|---|---|---|---|---|---|
| 010 | 00 | 00 | 00 | 00 | 00 | 00 | 00 | 60 | 71 | 0E | 02 | 00 | DB | 62 | 00 | 00 | ... |
| 020 | 46 | 49 | 4C | 45 | 31 | 20 | 20 | 20 | 54 | 20 | 00 | 00 | 00 | 00 | 00 | 00 | FILE2...TXT... |
| 030 | 00 | 00 | 00 | 00 | 00 | 00 | 00 | 60 | 71 | 0E | C0 | 00 | DB | 62 | 00 | 00 | ... |
| 040 | 46 | 49 | 4C | 45 | 31 | 20 | 20 | 20 | 54 | 20 | 00 | 00 | 00 | 00 | 00 | 00 | FILE3...TXT... |

TABLE 4-continued

| Partial Hex Dump of Root Directory Sector After References Changed | | | | | | | | | | | | | | | | | |
|---|---|---|---|---|---|---|---|---|---|---|---|---|---|---|---|---|---|
| 050 | 00 | 00 | 00 | 00 | 00 | 00 | 00 | 60 | 71 | 0E | 34 | 00 | DB | 62 | 00 | 00 | ... |
| 060 | 00 | 00 | 00 | 00 | 00 | 00 | 00 | 00 | 00 | 00 | 00 | 00 | 00 | 00 | 00 | 00 | ... |
| 070 | 00 | 00 | 00 | 00 | 00 | 00 | 00 | 00 | 00 | 00 | 00 | 00 | 00 | 00 | 00 | 00 | ... |
| 080 | 00 | 00 | 00 | 00 | 00 | 00 | 00 | 00 | 00 | 00 | 00 | 00 | 00 | 00 | 00 | 00 | ... |
| 090 | 00 | 00 | 00 | 00 | 00 | 00 | 00 | 00 | 00 | 00 | 00 | 00 | 00 | 00 | 00 | 00 | ... |
| 0A0 | 00 | 00 | 00 | 00 | 00 | 00 | 00 | 00 | 00 | 00 | 00 | 00 | 00 | 00 | 00 | 00 | ... |
| 0B0 | 00 | 00 | 00 | 00 | 00 | 00 | 00 | 00 | 00 | 00 | 00 | 00 | 00 | 00 | 00 | 00 | ... |
| 0C0 | 00 | 00 | 00 | 00 | 00 | 00 | 00 | 00 | 00 | 00 | 00 | 00 | 00 | 00 | 00 | 00 | ... |
| 0D0 | 00 | 00 | 00 | 00 | 00 | 00 | 00 | 00 | 00 | 00 | 00 | 00 | 00 | 00 | 00 | 00 | ... |
| 0E0 | 00 | 00 | 00 | 00 | 00 | 00 | 00 | 00 | 00 | 00 | 00 | 00 | 00 | 00 | 00 | 00 | ... |
| 0F0 | 00 | 00 | 00 | 00 | 00 | 00 | 00 | 00 | 00 | 00 | 00 | 00 | 00 | 00 | 00 | 00 | ... |

Sub-directory references are treated in exactly the same way as the root directory.

A preferred feature of the backup method described above is the recording of the time of each write operation. By recording the exact date and time of each and every disk write onto the tape, data may be replayed up to any given point in time. Replay can be suspended to enable the copying of files and then resumed any number of times. It is also possible in the preferred method in accordance with the invention to calculate the file name currently being updated so that it is a simple matter to reconstruct data to any stage and all states of the disk and hence the files contained within it are recorded. The suspension of replay allows the user to recover information that may later have been deleted.

The software described above loads automatically when the user switches on the computer and makes a complete copy of all changes to the disk up to the point at which the machine is switched off. It thus provides a complete "audit trail" of every change made to the disk as it happens. The entire operation happens automatically without affecting normal operation of the computer. Data is not lost and the user has a complete backup which can be removed immediately.

In the preferred method, the software allows the user to select any combination of a plurality of physical or logical hard disk drives (or other storage devices) to be monitored. The system is thus particularly suitable for network systems.

The preferred method also has the following features:

Tape Marks: The user can at any time place a 'mark' on the backup tape to signify some event. This mark can include a user defined text message, and assists in recovering data to a specified point. The replay option always stops and displays the comment when it encounters a tape mark.

Fail Safe Operation: In the event of corruption or power failure, data is preserved up to the moment before the failure occurred, the writing of an end of data mark to the tape is not required.

Turnkey Operation: The AUTOEXEC file can include commands to continue the current real time backup from the point it left off. The previous tape can continue to be used or a fresh one substituted. Even if both tape drive and PC were completely powered off, the backup software uses a high speed seeking algorithm to find the end of the recorded data and continue from that point. If the tape drive power was not cut (even if the PC was re-booted) then no seeking is required and the backup continues immediately. The backup software knows how much tape has been used and how much remains, even after a total power failure.

End of Tape and Alarm Warnings: The configuration contains a user-defined alarm setting. When this amount of data has been written, the backup software sounds a continuous two-tone alarm to notify the user that the tape is running out. Operation of the currently running software package is not affected. This alarm also sounds in the event of tape failure for whatever reason. The user can adjust the configuration file to abandon real time backup in the event of tape drive failure, or to set the hard disk to read-only to prevent further updates whilst the problem is rectified.

From the point of view of the user the principle of operation is as follows:

1) A simple configuration file enables the user to select any combination of up to three physical or logical hard disk drives to be monitored.
2) A "snapshot" option of the backup software is then used to recall mirror images of the appropriate drive or drives.
3) The backup operation is then activated, automatically recording changes to the hard drive as they happen.
4) Should it become necessary to reconstruct the disk due to an error, or on request, the user copies the mirror image back to the drive and then replays the backup tape to reconstruct the disk up to the moment before the error, or requested point occurred.

What is claimed is:

1. A method of operating a microprocessor-based data processing system including a random access memory, a central processing unit and a non-volatile storage device, the method comprising the steps of:
   providing first instructions sorted in the memory to the central processing unit to cause the central processing unit to write data periodically to basic storage means forming at least part of the storage device, and
   for a plurality of such first write operations, instructing the central processing unit to execute a plurality of corresponding backup write operations to write the same data to backup storage means, each said backup write operation being performed by a second sequence of instructions stored in said memory, and said second sequence of instructions being associated with said first write operations for writing data to the basic storage means.

2. A method according to claim 1, wherein the backup write operations comprise writing the same said data to another non-volatile storage device.

3. A method according to claim 1, wherein the said backup write operations are controlled such that the data for successive backup write operations are stored at different locations in the backup storage means whereby data which is overwritten in the said basic storage means is retained in the backup storage means.

4. A method according to claim 1, wherein said instructions for causing the backup write operations are stored and are executed at a basic input/output level of the data processing system.

5. A method according to claim 1, wherein information copied to the backup storage means is stored as a sequential list of write operations.

6. A method according to claim 1, wherein each write operation is stored in the backup storage means as a location element and a data element, the location element containing information relating to the location of the data when stored in the basic storage means.

7. A method according to claim 6, wherein each location element has associated with it information relating to the date and time of the corresponding write operation.

8. A method according to claim 6, including a restoring of data from the backup storage means to destination storage means, wherein the restoring step comprises determining the location of faulty parts of the destination storage means and establishing a translation table for substituting new location elements in place of the stored location elements so that data can be restored to correctly functioning parts of the destination storage means.

9. A method according to claim 8, further including alteration of a file allocation table and directories associated with the original data.

10. A method of operating a data processing device comprising the steps of:
providing backup storage means for storing as a sequential list write operations written to basic storage means, each write operation being stored in the backup storage means as a location element and a data element with the location element containing information relating to the location of the data element when stored in the basic storage means,
determining the location of faulty parts of a destination storage means, and
establishing a translation table for allocating to the data element new location elements in place of the stored location elements for restoring the data elements to correctly functioning parts of the destination storage means.

11. A method according to claim 10, including alteration of a file allocation table and directories in an original data.

12. A method according to claim 10, wherein the instructions of controlling the restoring of data are stored and executed at a basic input/output level of the data processing system.

13. A method according to claim 10, wherein the translation table is established at a basic input/output level of the data processing system.

14. In a microprocessor-based data processing system comprising a random access memory, a central processing unit, and a non-volatile storage device, a method of providing a backup for data written to the non-volatile storage device, wherein the method includes the steps of:
performing, for each write operation in which data is written to basic storage means forming at least part of said storage device, a backup write operation in which said data is also written as a data block to backup storage means together with a location block containing information relating to the location of said data when stored in the basic storage means, and
storing the backup write operations for successive write operations to said basic storage means in the backup storage means as a sequential list of location and data block pairs stored in different respective locations of the backup storage means, each said backup write operation being performed by a first sequence of instructions which are stored in said random access memory and are associated with a second sequence of instructions for executing said write operations for writing data to the basic storage means.

15. A method according to claim 14, wherein the write operations to the basic storage means and the backup storage means are performed at the level of a basic input/output system (BIOS).

16. A method according to claim 14, further including a method for restoring data from the backup storage means to destination storage means, wherein the restoring method includes establishing a translation table in said memory, reading a said location block from the backup storage means, assigning a new location if the location in the destination storage means represented by said location block is faulty and registering the new location in the translation table in association with the former location, reading said data block associated with said location block from the backup storage means and writing it to said destination storage means, repeating said reading, assigning, reading and writing steps until all a data required to be restored has been restored to the destination storage means.

17. A method according to claim 16, wherein the restoring method further includes the steps of scanning a file allocation table and directory and altering address references therein of locations which are indicated by the translation table as having been changed.

18. An improved microprocessor-based data processing system comprising a random access memory, a central processing unit, a non-volatile basic storage means, and non-volatile backup storage means, wherein the improvement comprises:
means for performing a backup write step corresponding to each write operation in which data is written to said basic storage means, said backup write steps comprising the writing of said write operation to the backup storage means as a location block and a data block, the location block containing information relating to the location of the data block in said basic storage means, and
means for writing successive said write operations to said backup storage means as a sequential list, each location and data block pair being stored in a different respective location in the backup storage means, the backup write step being performed by a first sequence of instructions stored in said memory and associated with a second sequence of instructions for executing said write operation in which data is written to said basic storage means.

19. A system according to claim 18, wherein the memory has stored therein instructions for performing the backup write step, said instructions being stored at the level of a basic input/output system (BIOS).

20. A system according to claim 18, further including:
destination storage means for storing data stored in said backup means, and
means for establishing a translation table in said memory,
means for reading a said location block from the backup storage means, means for assigning a new location if the location in the destination storage means represented by said location block is faulty, means for registering the new location in the translation table in association with the former location, means for reading said data block associated with said location block from the backup storage means and writing it to said destination storage means, and means for repeating said reading, assigning, reading and writing until all the data required to be restored has been restored to the destination storage means.

21. A system according to claim 20, arranged to store a file allocation table and a directory, wherein the system is further programmed to scan said file allocation table and directory, and to alter address references therein of locations which are indicated by the translation table as having been changed.

* * * * *